Oct. 28, 1958   P. DOMBRE   2,857,930
MIXING VALVE
Filed May 9, 1955   4 Sheets-Sheet 1
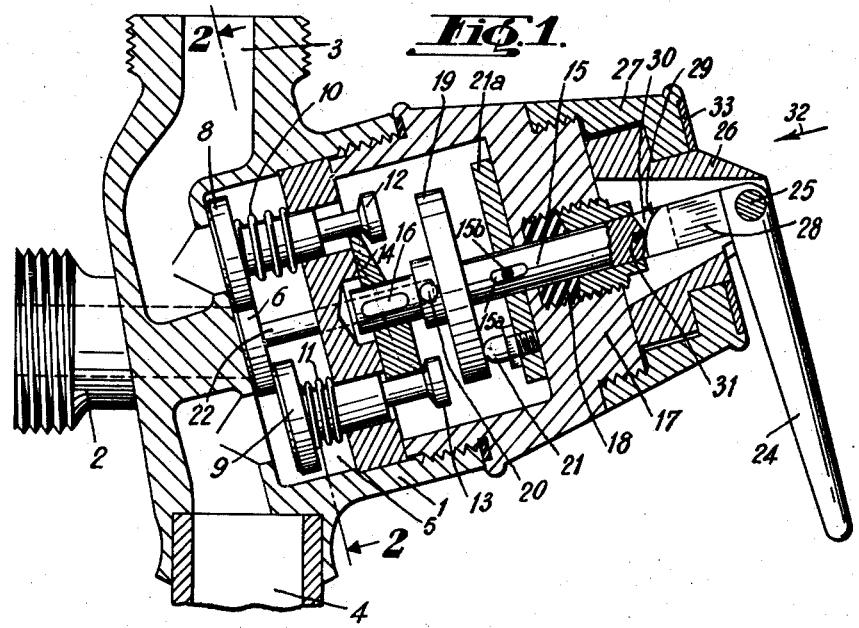
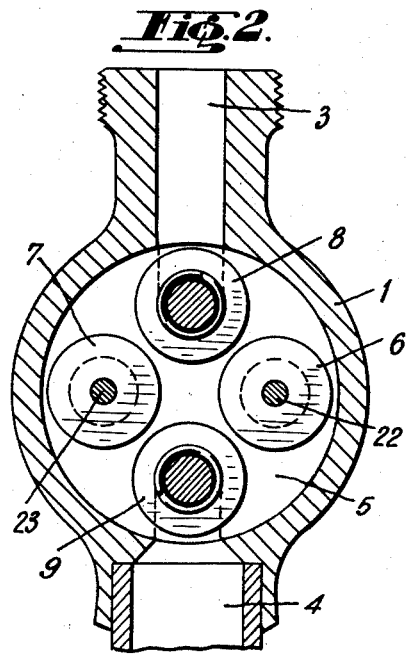
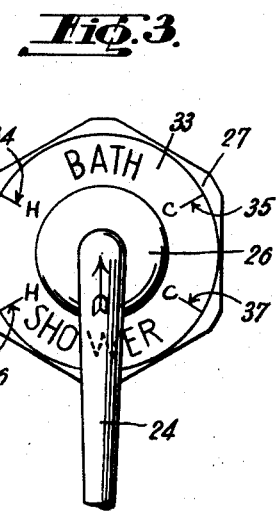

Oct. 28, 1958  P. DOMBRE  2,857,930
MIXING VALVE
Filed May 9, 1955  4 Sheets-Sheet 2
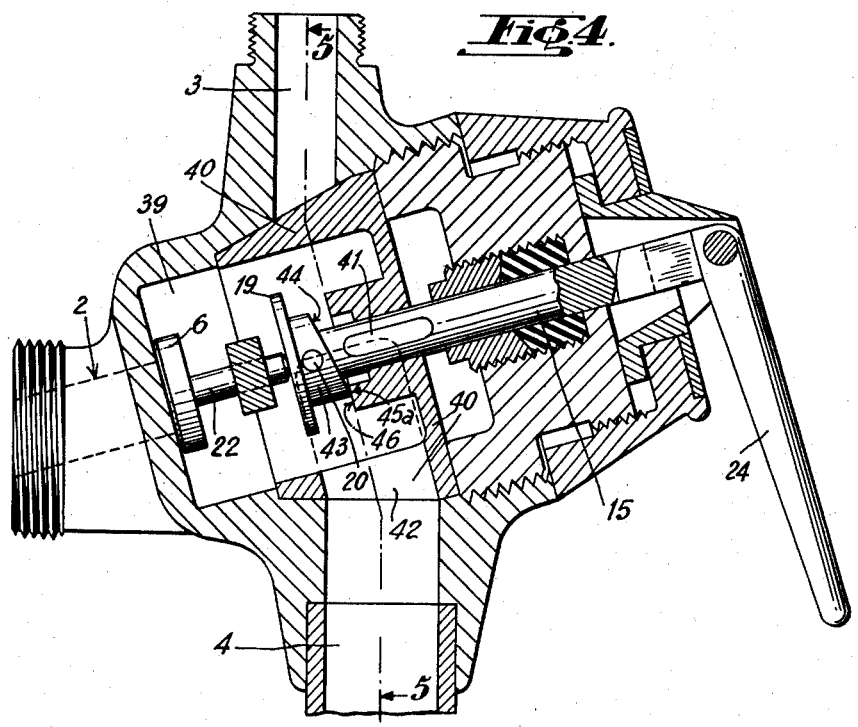
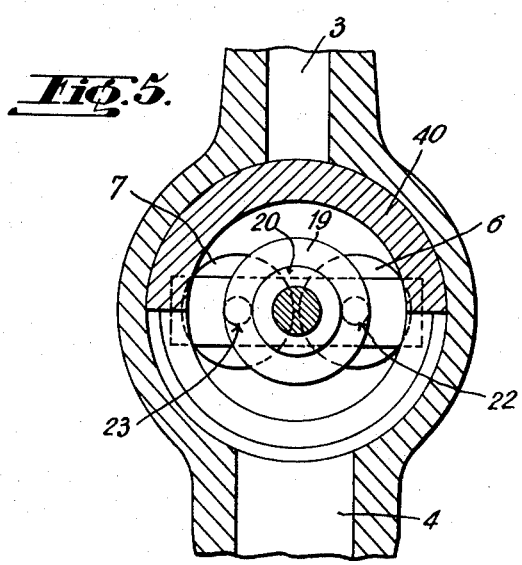

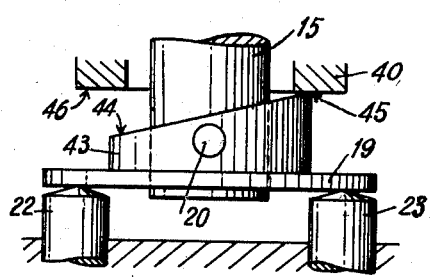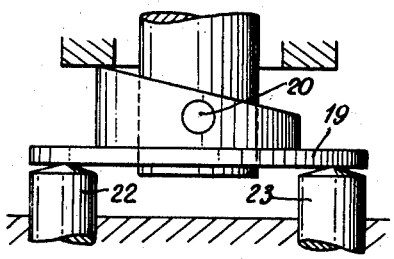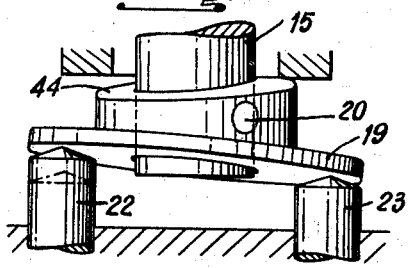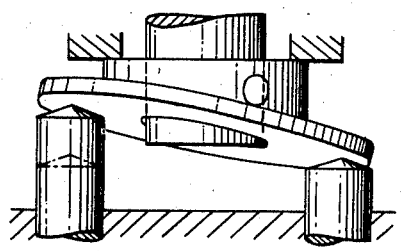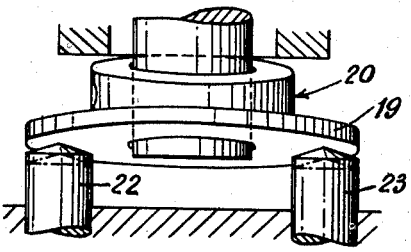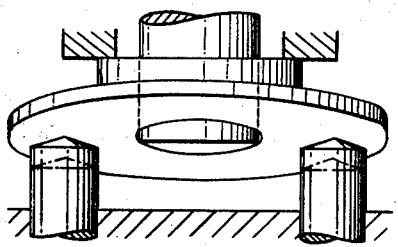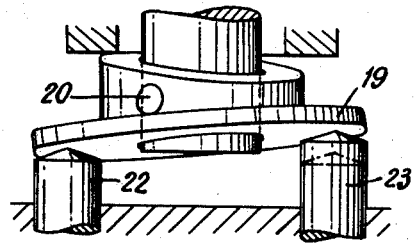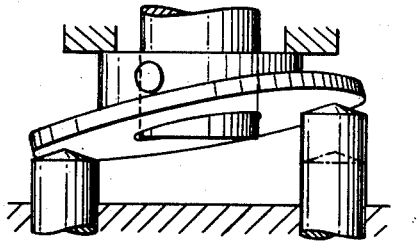

Oct. 28, 1958    P. DOMBRE    2,857,930
MIXING VALVE
Filed May 9, 1955    4 Sheets-Sheet 4
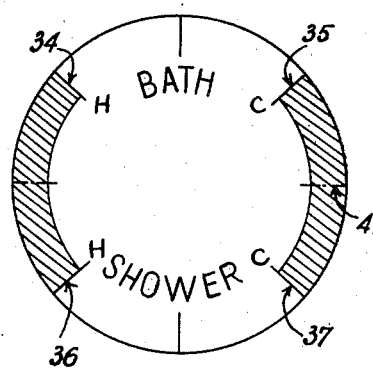
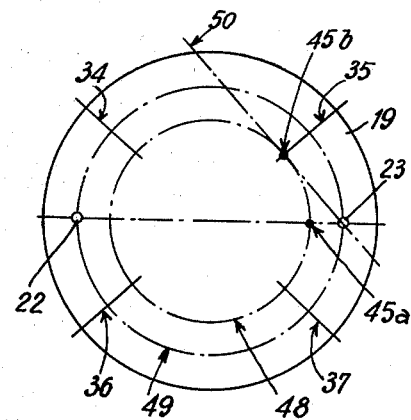
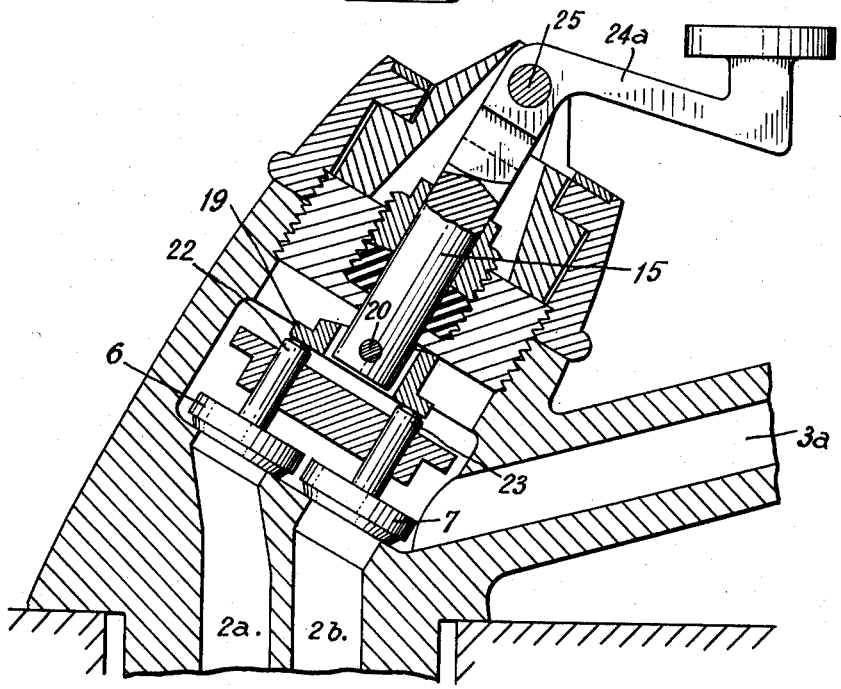

United States Patent Office 2,857,930
Patented Oct. 28, 1958

2,857,930

MIXING VALVE

Pierre Dombre, Geneva, Switzerland

Application May 9, 1955, Serial No. 507,043

Claims priority, application Switzerland May 12, 1954

6 Claims. (Cl. 137—627.5)

This invention relates to mixing valves and includes, as an object, the provision of an improved device for the mixing of fluids.

The present invention contemplates, by way of example, a mixing valve having two inlets and at least one outlet and which is characterized in that it comprises two valve heads which are mobile in parallel directions and each of which controls one of the inlets. Further provided is a control member having a surface to cooperate with these valve heads in order to determine their positions, this member being angularly mobile around a first axis, which is parallel to the direction of motion of the valve heads, and around a second axis perpendicular to the first, this member cooperating with a stop which is fixed in relation to the abovementioned direction.

The accompanying drawing illustrates, by way of example, three embodiments of a mixing valve according to the invention.

Fig. 1 is an axial cross-sectional view of the first embodiment.

Fig. 2 is a cross-section along 2—2 in Fig. 1.

Fig. 3 is a detailed view corresponding to Fig. 1.

Fig. 4 is an axial cross-sectional view of a second embodiment.

Fig. 5 is a cross-section along 5—5 in Fig. 4.

Figs. 6 to 13 are partial schematic views illustrating the operation of these two first embodiments.

Figs. 14 and 15 are diagrams which also serve to explain the operation of these two first embodiments.

Fig. 16 is a longitudinal cross-section of a third embodiment.

The mixing valve illustrated in Figs. 1 to 3 is a valve for a bath battery and is provided with a body 1 comprising two inlets, one for cold water and the other for hot water, only one of which, 2, is visible on the drawing. This body is fitted with two outlets, one of which, 3, leads to the shower and the other, 4, to the bath tub.

The inlets such as 2 open into a chamber 5 of the body 1 through openings which are each controlled by a valve head 6 or 7. The communication between the chamber 5 and the outlet 3 is controlled by a valve head 8, while the communication between this chamber and the outlet 4 is controlled by a similar valve head 9. These two latter valve heads are urged by a spring 10 or 11, so as to move towards and to remain in their closed position.

Each of the valve heads 8, 9 comprises a stem around which is arranged the springs 10, 11 and which ends in a head 12 or 13 cooperating with a cam 14 which is angularly secured to a control shaft 15 by means of a key 16. This control shaft is mobile in the axial direction as will be seen below, but the cam 14 is made axially immovable owing to its cooperation with the heads 12 and 13. This cam is shaped so as to open only one of the valve heads 8, 9 at a time. In the position shown in the drawing, the valve head 9 is open, while 8 is closed. Were the control shaft 15 to be rotated through an angle of 180° about its axis, then it is 8 which would be open and 9 which would be closed.

The shaft 15 slides in a part 17 of the valve body which is provided with a stuffing box 18. It carries a disc 19 which is pivoted at 20 and constantly rests by a point of its surface against a stop 21 which is angularly fixed in relation to 15. To this end, a longitudinal slot 15a is provided in the shaft 15 and a pin 15b is provided which passes through this slot and is driven into a part 21a carrying 21 and through which 15 passes. The valve heads 6, 7 are each provided with a stem 22 or 23 the free ends of which are in contact with the surface of the disc 19 which is opposite to that which rests against the stop 21. As will be seen in the following, it is the pressure in the two inlets such as 2 which acts on the valve heads 6, 7 so as to tend to make them rest by the end of their stem 22, 23 against this disc 19.

The mixing valve is provided with an actuating member constituted by a handle 24 pivoting at 25 on a part 26 which is made to be axially immovable in relation to the body of the valve by a cap 27. The part 26 can pivot on the valve body about an axis which coincides with that of the shaft 15. This handle 24 is provided with an arm 28 which terminates at its end by a cam surface engaged in a slot 30 of the terminal part of the shaft 15. The cam surface 29 cooperates with the bottom 31 of the slot 30 in order to move the shaft 15 from the right towards the left in Fig. 1. This displacement takes place against the action exerted on this shaft 15 through the stems 22, 23 and the disc 19 under the action of the pressure of the liquid in the two inlets such as 2.

Fig. 3 is a front view seen in the direction of the arrow 32. The cap 27 carries an annular plate 33 with a graduation serving to mark the position angularly assumed by the handle 24 when it rotates about the axis of the shaft 15. This plate 33 is provided with four datum marks 34, 35, 36, 37. Opposite 34 and 36 is marked the letter H which indicates that the position is that for hot water, whilst opposite 35 and 37 is marked the letter C, which indicates that the position is that for cold water. The sector limited by 34 and 35 bears the indication Bath and indicates that when the arrow 38 borne by the handle 24 coincides with this sector, the mixing valve delivers through the outlet Bath 4. The sector comprised between 36 and 37 bears the indication Shower, which signifies that, when the arrow 38 points towards it, the mixing valve delivers through the outlet Shower 3. When the arrow 38 points towards one of the lateral sectors respectively comprised between 34 and 36 and between 35 and 37, the valve does not deliver at all, both the valve heads 8 and 9 being then simultaneously closed as will be seen below. Before the detailed mode of operation of this first embodiment is explained with reference to Figs. 6 to 15, the second embodiment will also be described, for the mode of operation is quite similar.

In the second embodiment according to Figs. 4 and 5, the mixing valve also works with a bath and shower. It comprises a shower outlet 3, a bath tub outlet 4 and two inlets, one for hot water and one for cold water, only one of which is visible in 2. These inlets are controlled, as in the first embodiment, by two valve heads 6, 7, controlling the entry of the hot water and of the cold water into a mixing chamber 39. The communication between the mixing chamber 39 and the outlets 3, 4 takes place under the control of a plug 40, and not as in the first embodiment under the control of valve heads, this plug cooperating with the shaft 15 and a key 41 of this shaft allowing the latter to slide in relation to the plug 40 and at the same time to make it rotate. As may be seen in Fig. 5, the opening 42 of the plug extends over an angle of 180°.

As in the first embodiment, the valve heads 6, 7 are fitted with a stem 22 or 23, co-operating with a disc 19 pivoting on the shaft 15 about an axis 20 which is perpendicular to the axis of this shaft 15. In this second embodiment, the disc 19 is secured to a tubular part 43 which terminates at a plane surface 44 which is oblique in relation to the plane of this disc. The plane containing the surface 44 is parallel to the pivot axis 20. The point 45 of the terminal surface 44 of the part 43 which is farthest away from the disc 19 constantly cooperates with a plane surface of the plug 40 which is perpendicular to the shaft 15.

Fig. 6 shows the different parts in the positions they occupy when the handle 24 is in the neutral position, for which the arrow marked on the handle 24 (Fig. 3) points towards the point 47, in Fig. 14. The explanatory figures 6 to 13 actually concern the second embodiment, but they may also serve perfectly well to explain the operation of the first, the only difference being that in the first, the control Bath-Shower is effected by means of valve heads, whereas in the second, it is effected by means of a plug. The mode of operation of the second embodiment will therefore now be described, the description applying to the first embodiment also:

In the position according to Fig. 6, the valve heads 6 and 7 are maintained in closed position by the disk 19. As may be seen, if one refers also to Fig. 15, this is due to the fact that the disk 19 is prevented from oscillating and that for this angular position of the shaft 15 of the handle 24, the shaft 15 is also restrained against axial movement. The circle 48 in Fig. 15 represents the path in a plane, of the point 45 for a complete turn of the handle 24 around the axis of the shaft 15. The concentric circle 49 represents the successive points of contact of the disc 19 with the valve head stems 22, 23 for a complete turn of the handle 24 around the axis of the shaft 15.

It may be seen in Fig. 15 that, for the case of Fig. 6, the point 45 is in 45a, i. e. in a plane, aligned with 22 and 23. The disc 19 and the cylindrical part 43 cannot therefore oscillate about 20 or about the point of contact 45. If the handle 24 is moved in the counterclockwise direction (Figs. 3, 14 and 15), this state of affairs continues until the moment when the arrow marked on the handle 24 points towards the datum mark 35. At this precise moment, the bath outlet 4 only communicates with the interior of the valve (through the plug 40 coupled to the valve head 9). The point 45 is then at 45b and the part 19, 43 can oscillate about the tangent 50 to the circle 48 which passes through 45b and also through 23. Under these conditions, the stem 23 is forced to remain immovable, while 22 can rise in proportion as the handle 24 is actuated in order to make it oscillate about the axis 25. Fig. 7 illustrates the positions of the parts when the handle 24 has a certain inclination corresponding for instance to half the maximum delivery. Fig. 8 illustrates the parts for the same angular position of the shaft 15 but for an inclination of the handle 24 about the axis 25 which corresponds to the maximum delivery. In these two Figs. 7 and 8, one therefore has the position Bath for cold water only, since the stem 23 of the valve head controlling the hot-water is maintained immovable in the closed position.

If the motion of the handle 24 is continued in the counterclockwise direction, it may be seen that for any position of this handle for which the arrow 38 points towards the sector comprised between 34 and 35, a mixture of hot water and of cold water is delivered towards the bath tub. When the arrow 38 is in the position shown in Fig. 3, i. e. half-way between 34 and 35, the mixture corresponds to equal deliveries of hot water and of cold water. Figs. 9 and 10 correspond to this case, Fig. 9 corresponding to an inclination of the handle 24 (in relation to 25) giving a delivery corresponding for instance to half the maximum delivery, while Fig. 10 corresponds to the maximum delivery.

When the arrow 38 points towards 34, the position is still on Bath, but now only hot water can flow, owing to the fact that now the stem 22 is maintained in the closed position for any position of the handle 24 about the axis 25, while 23 can rise and remain in contact with 19 when this handle is inclined. The situation is therefore the reverse of that corresponding to the Figs. 7 and 8, it being possible to open the hot water while the cold water remains closed. The Figs. 11 and 12 illustrate this case, the first corresponding to a delivery equal to half the maximum delivery, while Fig. 12 corresponds to the case of the maximum delivery, hot water only. If the rotation is kept up through an angle of 180°, starting from the initial position, the position according to Fig. 13 is attained, which is symmetrical to Fig. 6. For all positions of the arrow comprised between 34 and 36, the stems 22, 23 are maintained in the closed position. It is then that the plug 40 and the valve heads 8, 9 pass from the position Bath to the position Shower. If the rotation is continued so that the arrow points towards 34, this gives the position Shower with hot water only. When it points towards 37, this gives the position Shower with cold water only. The intermediate positions give a mixture of hot water and of cold water in various proportions. For the positions of the arrow pointing between 37 and 35, the two stems 22, 23 are again maintained in the closed position, as has been seen above. It is then that the plug 40, and the valve heads 8, 9 pass from the position Shower to the position Bath.

From the foregoing it may be seen that in the two described embodiments, the single handle 24 enables the battery to be actuated in such a manner as to send the water at will either towards the bath tub or towards the shower, and to control the mixture of hot water and of cold water between cold water only and hot water only while controlling the amount delivered at will at the same time. In other words, the handle 24 enables the control of the proportions and of the delivery to be effected and allows the water to be directed either towards the shower or towards the bath tub.

In the embodiment according to Fig. 16, there are two inlets 2a, 2b but only one outlet 3a. The valve in question is therefore, for instance, a mixing valve for a wash basin. In this case, the parts enabling the water to be directed at will in one or the other of two directions (Bath and Shower respectively) have been omitted. There only remain the two valve heads 6, 7 controlling the arrival of the hot water and the arrival of the cold water in order to proportion the mixture which flows from 3a. The stems 22, 23 of the valve heads 6, 7 are controlled in the same manner as in the case of the Figs. 4 and 5, i. e. by means of a disc 19 pivoted at 20 on the shaft 15. The actuating member 24a acts in exactly the same manner as the member 24 of the examples described. In this last embodiment, which is simpler than the preceding ones, the rotation of the handle 24 about the axis of the shaft 15 here also controls the proportion of hot water and of cold water between zero for the one and a maximum for the other, while the oscillation of the handle 24a about its pivot 25 adjusts the outlet delivery at 3a.

In the embodiments according to Figs. 1 to 15, the axes of the valve heads 6, 7 are at a distance from the axis of the shaft 15 which is greater than the distance between this axis and the point 45; this giving the advantage of having "dead" sectors indicated by shading in Fig. 14 and which enable insuring that the passage from the Bath position to the Shower position and vice versa is effected while the two valve heads 6 and 7 are both maintained in closed position. In the case of Fig. 16, these distances are equal and the angular motion of the handle 24 is equal to 180° for the passage from the position Cold to the position Hot and vice versa. By giving unequal values to these distances, the active travel would be reduced; there would then be, beyond this active travel, positions for which 6 and 7 would be closed as in the first two embodiments.

What I claim is:

1. A fluid mixing valve comprising two inlets, at least one outlet, a longitudinally movable and rotatable shaft, valve heads for controlling communication between said inlets and said outlet and movable in a direction parallel to said shaft, valve stems extending from said heads parallel to said shaft, a tilting control member on said shaft, one side of said tilting control member being in contact with said valve stems for controlling the positions of said heads, a stop abutting the other side of said control member and positioned so that with said control member perpendicular to said shaft said valve heads close said inlets, and means for controlling the angular displacement of the point of contact between said stop and said control member with respect to the axis of said shaft, said means being effective to turn said control member without altering its inclination to obtain a regulation of the valve head control which is independent of the longitudinal movement of said shaft and thereby of the fluid flowing through the mixing valve.

2. A valve according to claim 1 wherein said control member is carried by said shaft so as to be able to pivot about a first axis which is perpendicular to that of said shaft, said shaft being angularly as well as axially mobile in order to enable adjustment of the position of the control member.

3. A valve according to claim 1 comprising a mixing chamber in communication with said inlets and two outlets, and a second control member which is mobile with said shaft and which controls the communication between said mixing chamber and said two outlets.

4. A valve according to claim 1 wherein the axis of the valve heads and the point of contact of the control member with said stop are at the same distance from the axis perpendicular to said shaft.

5. A valve according to claim 1 wherein the axis of the valve heads is at a distance from the first axis which is greater than the distance from this axis to the point of contact of the control member with the stop.

6. A fluid mixing valve comprising two inlets, at least one outlet, a longitudinally movable and rotatable shaft, valve heads for controlling communication between said inlets and said outlet and movable in a direction parallel to said shaft, valve stems extending from said heads parallel to said shaft, a tilting control member pivoted on said shaft, one side of said tilting control member being in contact with said valve stems for controlling the positions of said heads, a stop abutting the other side of said control member and positioned so that with said control member perpendicular to said shaft said valve heads close said inlets, and means for controlling the angular displacement of the point of contact between said stop and said control member with respect to the axis of said shaft, said control member being movable without alteration of its inclination to obtain a regulation of the valve head control which is independent of the longitudinal movement of said shaft and thereby of the fluid flowing through the mixing valve.

References Cited in the file of this patent
UNITED STATES PATENTS

| | | |
|---|---|---|
| 1,012,851 | Hodgkinson | Dec. 26, 1911 |
| 2,040,663 | Mallet | May 12, 1936 |
| 2,171,992 | Rantine | Sept. 5, 1939 |
| 2,301,439 | Moen | Nov. 10, 1942 |
| 2,513,758 | Talbot | July 4, 1950 |
| 2,624,586 | Onasch | Jan. 6, 1953 |

FOREIGN PATENTS

| | | |
|---|---|---|
| 573,068 | Great Britain | Nov. 5, 1945 |